(12) United States Patent
Jang

(10) Patent No.: US 11,303,163 B2
(45) Date of Patent: Apr. 12, 2022

(54) WIRELESS POWER RECEIVING MODULE AND PORTABLE ELECTRONIC DEVICE COMPRISING SAME

(71) Applicant: AMOSENSE CO., LTD., Cheonan-si (KR)

(72) Inventor: Kil Jae Jang, Seongnam-si (KR)

(73) Assignee: AMOSENSE CO., LTD., Cheonan-si (KR)

( * ) Notice: Subject to any disclaimer, the term of this patent is extended or adjusted under 35 U.S.C. 154(b) by 0 days.

(21) Appl. No.: 16/980,050

(22) PCT Filed: Mar. 13, 2019

(86) PCT No.: PCT/KR2019/002883
§ 371 (c)(1),
(2) Date: Sep. 11, 2020

(87) PCT Pub. No.: WO2019/177357
PCT Pub. Date: Sep. 19, 2019

(65) Prior Publication Data
US 2021/0021161 A1 Jan. 21, 2021

(30) Foreign Application Priority Data

Mar. 14, 2018 (KR) .................. 10-2018-0029827
Aug. 10, 2018 (KR) .................. 10-2018-0093780

(51) Int. Cl.
| | | |
|---|---|---|
| *H02J 50/70* | (2016.01) | |
| *H02J 50/10* | (2016.01) | |
| *H01F 27/255* | (2006.01) | |
| *H01F 27/28* | (2006.01) | |
| *H02J 7/02* | (2016.01) | |
| *H04M 1/02* | (2006.01) | |

(52) U.S. Cl.
CPC ............ *H02J 50/70* (2016.02); *H01F 27/255* (2013.01); *H01F 27/2804* (2013.01); *H01F 27/2885* (2013.01); *H02J 7/02* (2013.01); *H02J 50/10* (2016.02); *H04M 1/0202* (2013.01)

(58) Field of Classification Search
CPC ......... H02J 50/70; H02J 50/10; H01F 27/255; H01F 27/2804; H01F 27/2885
USPC ...................................................... 307/104
See application file for complete search history.

(56) References Cited

U.S. PATENT DOCUMENTS

| | | | | |
|---|---|---|---|---|
| 9,643,505 B2* | 5/2017 | Ichikawa | .............. | B60L 53/124 |
| 9,673,509 B2 | 6/2017 | Park et al. | | |
| 10,897,153 B2* | 1/2021 | Vijayan | .................. | H02J 50/12 |

(Continued)

FOREIGN PATENT DOCUMENTS

| | | |
|---|---|---|
| JP | 2013169138 A | 8/2013 |
| KR | 20130015244 A | 2/2012 |

(Continued)

*Primary Examiner* — Alfonso Perez Borroto
(74) *Attorney, Agent, or Firm* — Rothwell, Figg, Ernst & Manbeck, P.C.

(57) ABSTRACT

A wireless power receiving module is provided. A wireless power receiving module according to one embodiment of the present invention comprises: a wireless power receiving antenna in which a conductive member having a rectangular cross section is formed in a loop shape; and a shielding sheet disposed on one surface of the antenna for shielding a magnetic field, wherein one surface of the antenna is directly attached to the shielding sheet.

17 Claims, 12 Drawing Sheets

(56) References Cited

U.S. PATENT DOCUMENTS

| | | | |
|---|---|---|---|
| 2014/0049212 A1* | 2/2014 | Sawa | H02J 50/12 320/108 |
| 2014/0247547 A1 | 9/2014 | Jung et al. | |
| 2015/0207207 A1* | 7/2015 | Park | H01Q 7/00 343/702 |
| 2015/0244181 A1* | 8/2015 | Kagami | H02J 7/025 307/104 |
| 2016/0114687 A1* | 4/2016 | Ichikawa | H02J 7/025 701/22 |
| 2016/0211702 A1* | 7/2016 | Muratov | H02J 50/10 |
| 2016/0233723 A1 | 8/2016 | Lestoquoy et al. | |

FOREIGN PATENT DOCUMENTS

| KR | 20130035879 A | 4/2013 |
|---|---|---|
| KR | 20140011955 A | 1/2014 |
| KR | 20150065001 A | 6/2015 |

* cited by examiner

WIRELESS POWER RECEIVING MODULE AND PORTABLE ELECTRONIC DEVICE COMPRISING SAME

CROSS REFERENCE TO RELATED APPLICATIONS

This application is the national phase entry of International Application No. PCT/KR2019/002883, filed on Mar. 13, 2019, and designating the United States, which is based upon and claims priority to Korean Patent Applications 10-2018-0029827, filed on Mar. 14, 2018 and 10-2018-0093780, filed on Aug. 10, 2019, the entire contents of which are incorporated herein by reference.

TECHNICAL FIELD

The present invention relates to a wireless power receiving module and a portable electronic device including the same.

BACKGROUND

Recently, a portable terminal can easily charge a built-in battery through a wireless charging function. Wireless charging is performed through a wireless power receiving module embedded in the portable terminal and a wireless power transmission module which supplies power to the wireless power receiving module.

The wireless power receiving module includes a shielding sheet, and a wireless power receiving antenna which is disposed on one surface of the shielding sheet and receives wireless power.

Meanwhile, as a recent portable terminal becomes light, thin, short, and small, the wireless power receiving module embedded in the portable terminal also has to be implemented with a very thin thickness.

Accordingly, the wireless power receiving antenna is formed in an antenna pattern on one surface of a circuit board so that the wireless power receiving module can be implemented in a thin shape.

That is, the wireless power receiving antenna is formed in the antenna pattern by etching a flexible copper clad laminated (FCCL) film.

However, the FCCL film is relatively more expensive than other materials and thus causes an increase in production costs of the wireless power receiving module.

SUMMARY OF THE INVENTION

The present invention is directed to providing a wireless power receiving module which is implemented with a thin thickness while minimizing the use of an expensive flexible copper clad laminated (FCCL) film and a portable electronic device including the same.

Further, the present invention is directed to providing a wireless power receiving module, in which an auxiliary shielding sheet is laminated on one surface of a shielding sheet to form a horizontal surface with a wireless power receiving antenna so that required charging efficiency is satisfied even when a thickness of the shielding sheet is reduced, and a portable electronic device including the same.

One aspect of the present invention provides a wireless power receiving module including: a wireless power receiving antenna in which a conductive member having a rectangular cross section is formed in a loop shape; and a shielding sheet disposed on one surface of the wireless power receiving antenna to shield a magnetic field, wherein the one surface of the wireless power receiving antenna is directly attached to the shielding sheet.

Further, the wireless power receiving module may include a connection member configured to connect both end portions of the wireless power receiving antenna to apply power to the wireless power receiving antenna. In this case, the connection member may be a thin flexible circuit board.

In this case, the wireless power receiving module may include an accommodation groove inwardly recessed in one surface of the shielding sheet to prevent an increase in thickness according to use of the connection member.

Further, the conductive member may have a width two or more times a thickness thereof so that the wireless power receiving module may be thinned.

In addition, the wireless power receiving module may further include an auxiliary shielding sheet laminated on the one surface of the shielding sheet, wherein the auxiliary shielding sheet is disposed to form a coplanar surface with the conductive member.

In this case, the auxiliary shielding sheet may include an inverse pattern portion formed as a reverse image of a pattern portion of the wireless power receiving antenna. In this case, the inverse pattern portion may be disposed in a space formed between the pattern portions of the wireless power receiving antenna.

For example, as the inverse pattern portion is formed through etching, the auxiliary shielding sheet may be combined with the wireless power receiving antenna to form a coplanar surface with the wireless power receiving antenna.

Alternatively, in the auxiliary shielding sheet, since magnetic powder in a slurry state is applied on the one surface of the shielding sheet and then dried, the inverse pattern portion may form a coplanar surface with the wireless power receiving antenna.

Meanwhile, the above-described wireless power receiving module may be applied to a portable electronic device such as a mobile phone.

According to the present invention, since a wireless power receiving antenna is formed through a polygonal cross-sectional conductive member, a required thin thickness can be satisfied and production costs can be reduced to realize an inexpensive product.

Further, in the present invention, since an auxiliary shielding sheet is laminated on one surface of a shielding sheet to form a horizontal surface with the wireless power receiving antenna, required charging efficiency can be satisfied even when an overall thickness is realized as a very thin thickness, for example, a thickness of 0.2 mm or smaller.

DETAILED DESCRIPTION OF THE INVENTION

Figure 1:
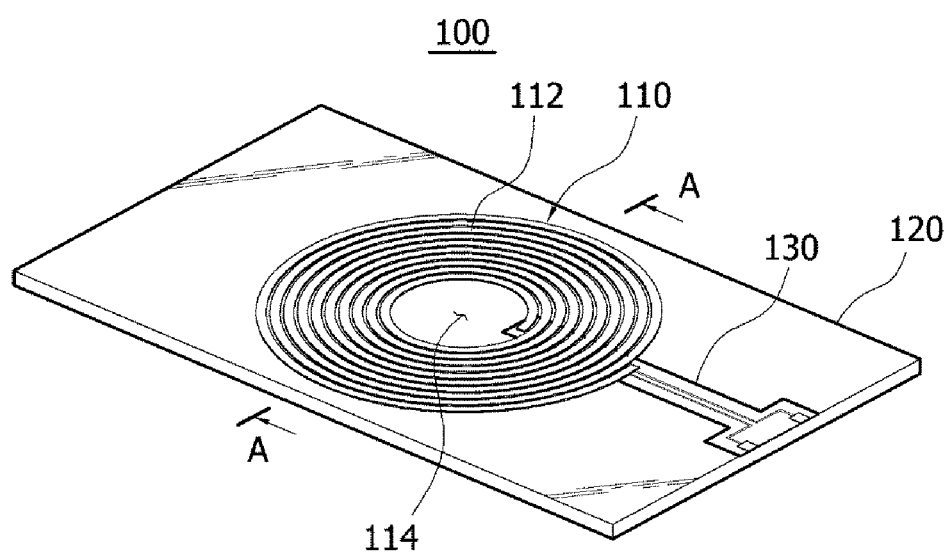
FIG. 1 is a view illustrating a wireless power receiving module according to one embodiment of the present invention.

Hereinafter, exemplary embodiments of the present invention will be described in detail with reference to the accompanying drawings which may allow one of ordinary skill in the art to easily carry out the present invention. The present invention may be implemented in various forms and is not limited to the following embodiments. Components not related to the description are not included in the drawings to clearly describe the present invention, and the same reference symbols are used for the same or similar components in the description.

As shown in FIGS. 1 to 11, a wireless power receiving module 100, 100', 200, or 200' according to one embodiment of the present invention includes a wireless power receiving antenna 110 and a shielding sheet 120 or 220.

The wireless power receiving antenna 110 may generate power required for the portable electronic device by receiving a wireless power signal transmitted from a wireless power transmission module. That is, the wireless power receiving antenna 110 may serve as a receiving coil (Rx coil) (a secondary coil).

The above-described wireless power receiving antenna 110 may be formed so that a conductive member A has a loop shape, and may be directly attached to one surface of the shielding sheet 120 or 220 through an adhesive layer.

In this case, the wireless power receiving antenna may be punched through stamping so that the conductive member A has a rectangular cross section.

For example, the wireless power receiving antenna may be a punched object punched from a plate-like sheet having a predetermined thickness. As a non-limiting example, the wireless power receiving antenna may be a punched object punched from a metal sheet such as copper, but is not limited thereto, and all materials which may be used for an antenna and may be punched may be used without limitation.

Accordingly, since the wireless power receiving module 100, 100', 200, or 200' according to one embodiment of the present invention may implement the wireless power receiving antenna 110 without using an expensive flexible copper clad laminated (FCCL) film, production costs may be reduced.

Further, in the present invention, since the wireless power receiving antenna may be formed as a punched object punched from a plate-like sheet through stamping, and thus winding work is omitted in comparison with a conventional flat coil formed by winding a conductive member in one direction, work convenience may be enhanced.

Figure 5:
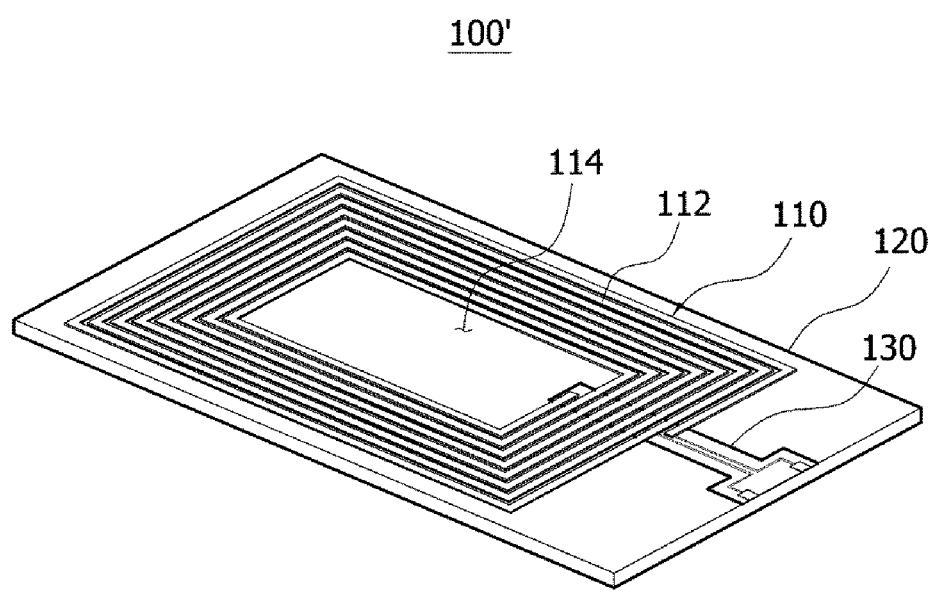
FIG. 5 is a view illustrating a case in which a wireless power receiving antenna is formed in a quadrangular shape in FIG. 1.
Figure 7:
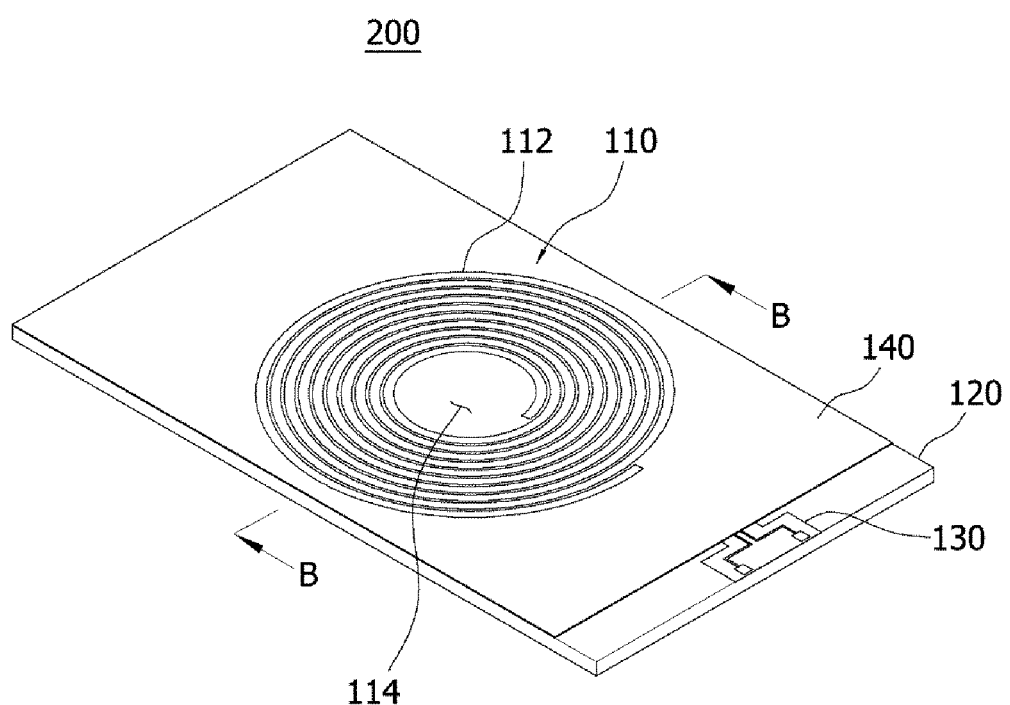
FIG. 7 is a view illustrating a wireless power receiving module according to another embodiment of the present invention.

Here, the wireless power receiving antenna may include a pattern portion 112 in which the conductive member A having a predetermined diameter is formed in the loop shape, and a center portion of the pattern portion 112 may be formed with an empty space 114 having a predetermined area. Further, in the wireless power receiving antenna, the pattern portion 112 may have a circular shape as shown in FIGS. 1 and 7, and the pattern portion 112 may be have a rectangular shape as shown in FIG. 5.

Figure 4:
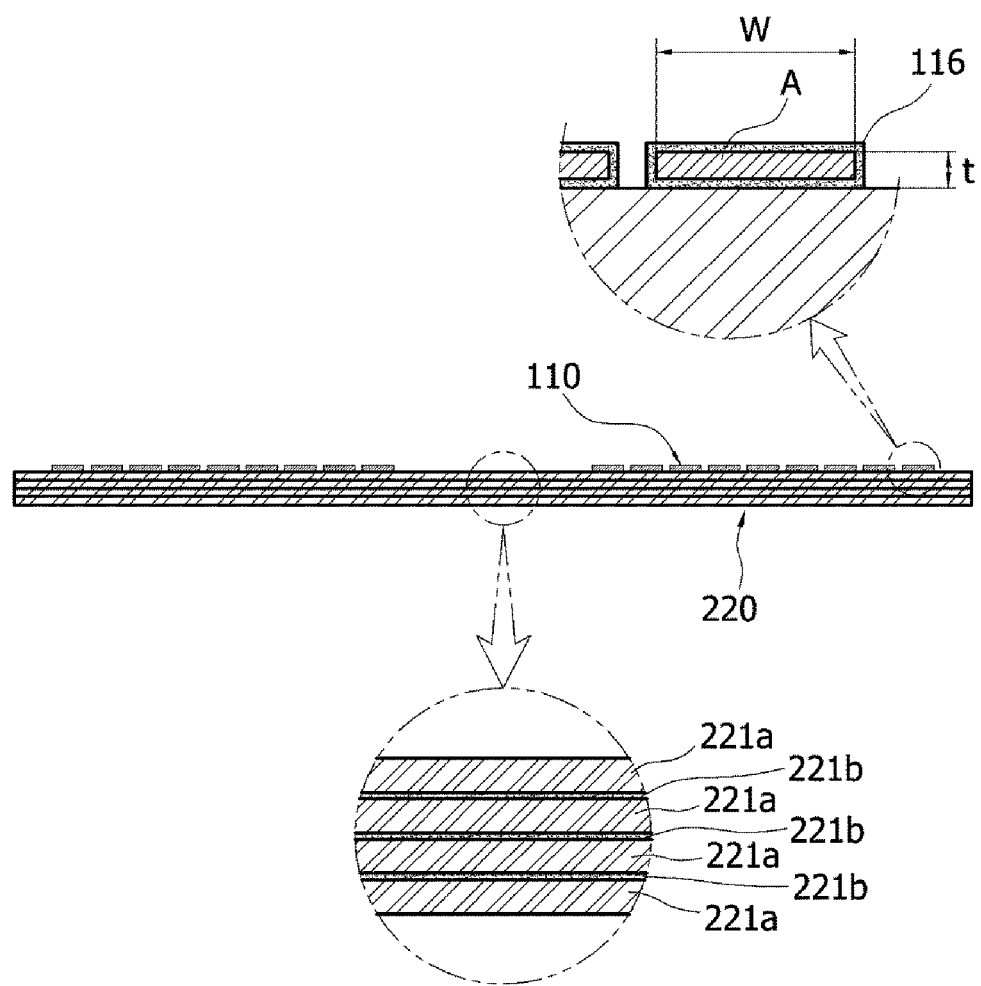
FIG. 4 is a view illustrating a case in which an insulating layer is formed on a surface of a conductive member in FIG. 3.
Figure 10:
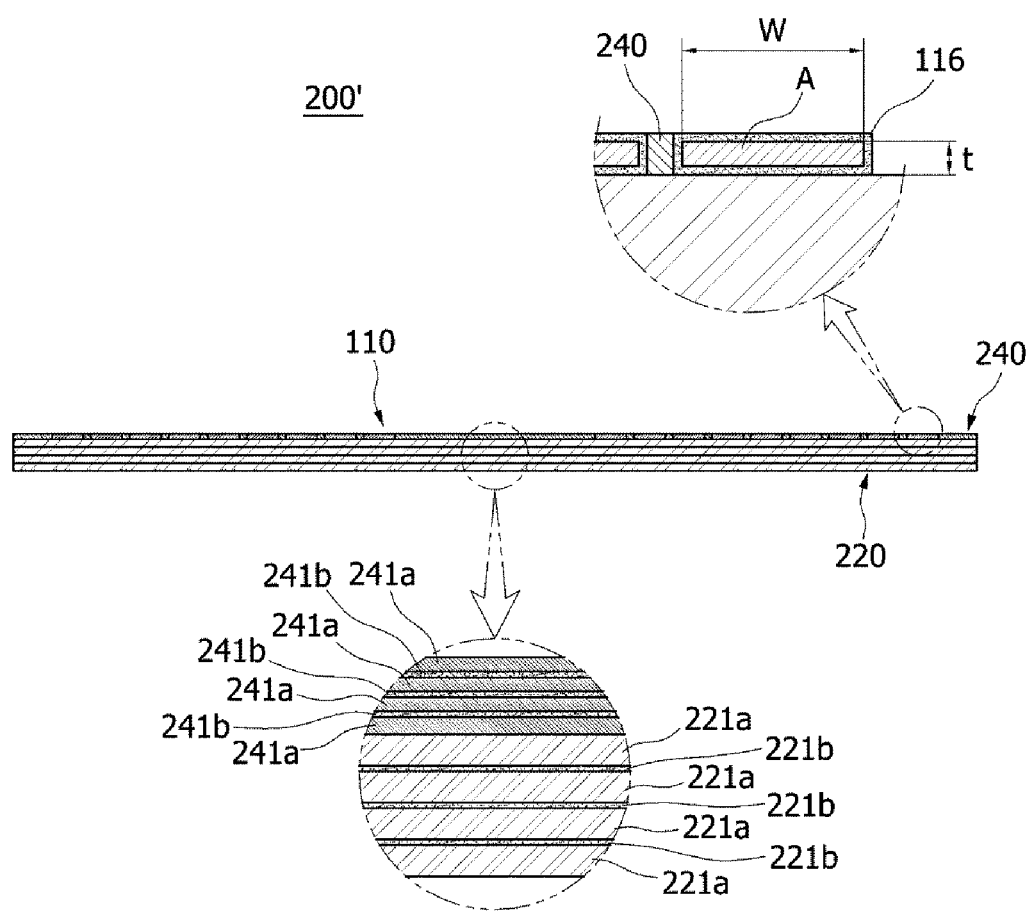
FIG. 10 is a view illustrating a case in which an insulating layer is formed on a surface of a conductive member in FIG. 9.
Figure 11:
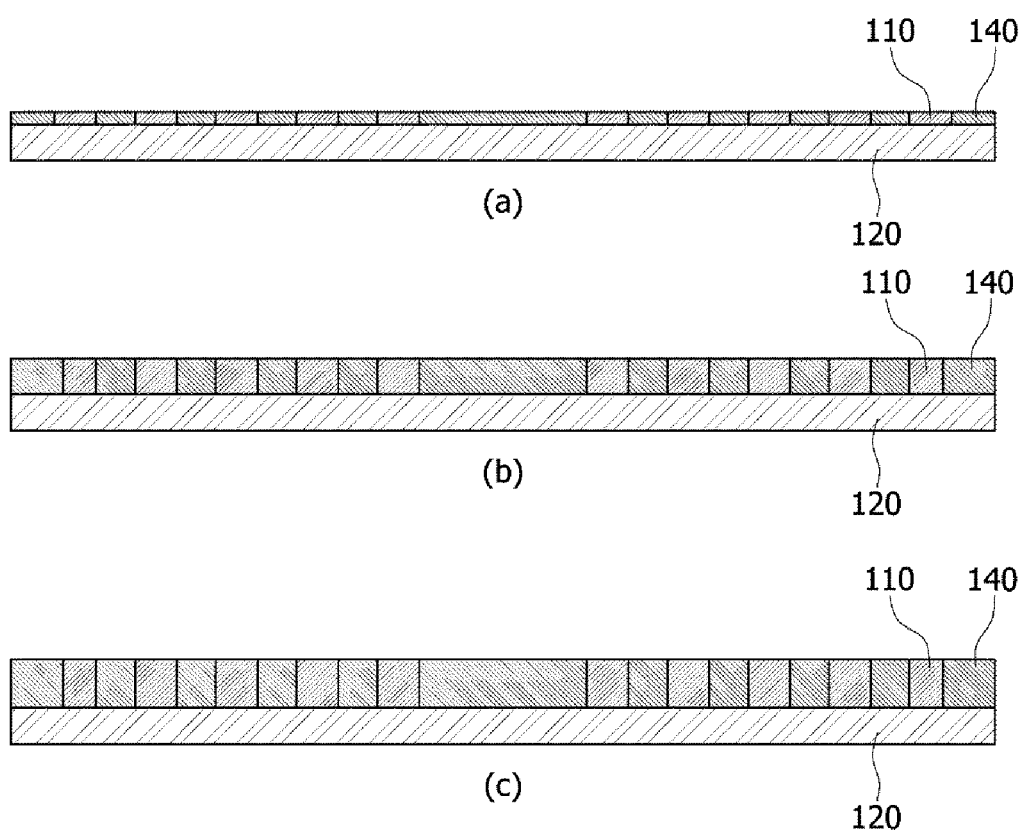
FIG. 11 is an exemplary view illustrating various relations between a width and a thickness of the conductive member in FIG. 9.

In addition, the wireless power receiving antenna may include an insulating layer 116 formed on a surface of the conductive member A with a predetermined thickness as shown in FIGS. 4 and 10. Accordingly, even when the shielding sheet 120 or 220 or an auxiliary shielding sheet 140 or 240, which will be described later, is formed of a material including a metal component, the conductive member A may be insulated from the shielding sheet 120 or 220 through the insulating layer 116. Accordingly, an electrical short between the conductive member A and the shielding sheet 120 or 220 may be prevented from occurring through the insulating layer 116.

Meanwhile, the wireless power receiving antenna 110 may receive power from the outside due to an electrical connection between both end portions and the outside. In this case, the wireless power receiving antenna 110 may be arranged so that both end portions do not overlap the pattern portion 112.

That is, one of both end portions of the wireless power receiving antenna may be formed to be located in the empty space 114 of the pattern portion 112, and the other end may be formed to be located at an outer edge side of the pattern portion 112.

In this case, in the wireless power receiving module 100, 100', 200, or 200' according to one embodiment of the present invention, both end portions of the wireless power receiving antenna 110 may be electrically connected to the outside through a separate connection member 130.

Accordingly, the wireless power receiving antenna 110 may receive power supplied from the outside through the connection member 130.

To this end, both end portions of the wireless power receiving antenna 110 may be directly connected to the connection member 130, and the connection member 130 may be electrically connected to an external power supply. Further, the connection member 130 may be a thin plate-like member.

Specifically, the connection member 130 may be a circuit board having a circuit pattern for electrical connection formed in at least one surface thereof, and the circuit board may be a flexible circuit board.

Further, both end portions of the wireless power receiving antenna 110 may be directly connected to one surface of the flexible circuit board, and the flexible circuit board may be electrically connected to the external power supply.

In this case, the flexible circuit board may have a length the same as or relatively greater than a distance between both end portions of the pattern portion 112. Further, the flexible circuit board may be disposed between the pattern portion 112 and the shielding sheet 120 or 220 to cross a portion of the pattern portion 112.

Accordingly, both end portions of the wireless power receiving antenna 110 may be located at an outer side of the pattern portion 112 and in the empty space 114 of the pattern portion 112, respectively. Accordingly, since the conductive members A constituting the wireless power receiving antenna 110 may be arranged so that overall lengths do not coincide or overlap each other, an increase in thickness due to overlapping may be prevented, and power may be smoothly supplied through the connection member 130.

Further, since the flexible circuit board may have a minimum area or length for connecting both end portions of the wireless power receiving antenna 110, use of the flexible circuit board may be minimized to reduce production costs.

In this case, the wireless power receiving module 100, 100', 200, or 200' according to one embodiment of the present invention may include an accommodation groove 122 which accommodates a thickness of the connection member 130, and the connection member 130 may be disposed in the accommodation groove 122.

Figure 2:
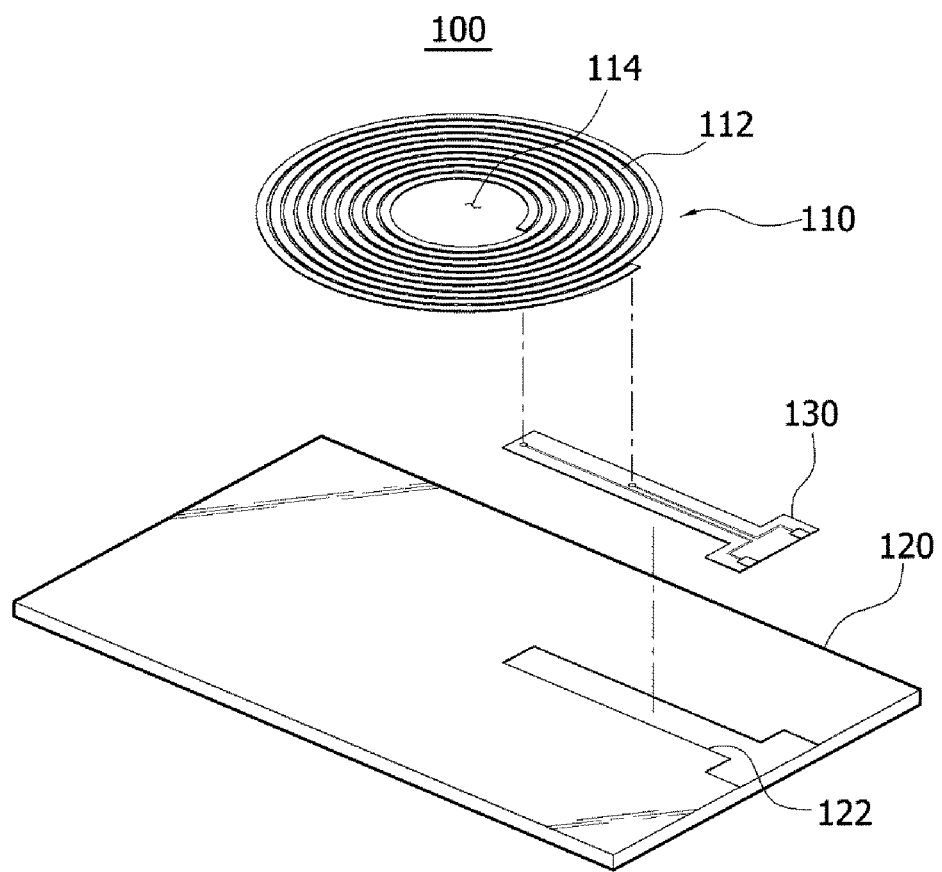
FIG. 2 is an exploded view of FIG. 1.
Figure 6:
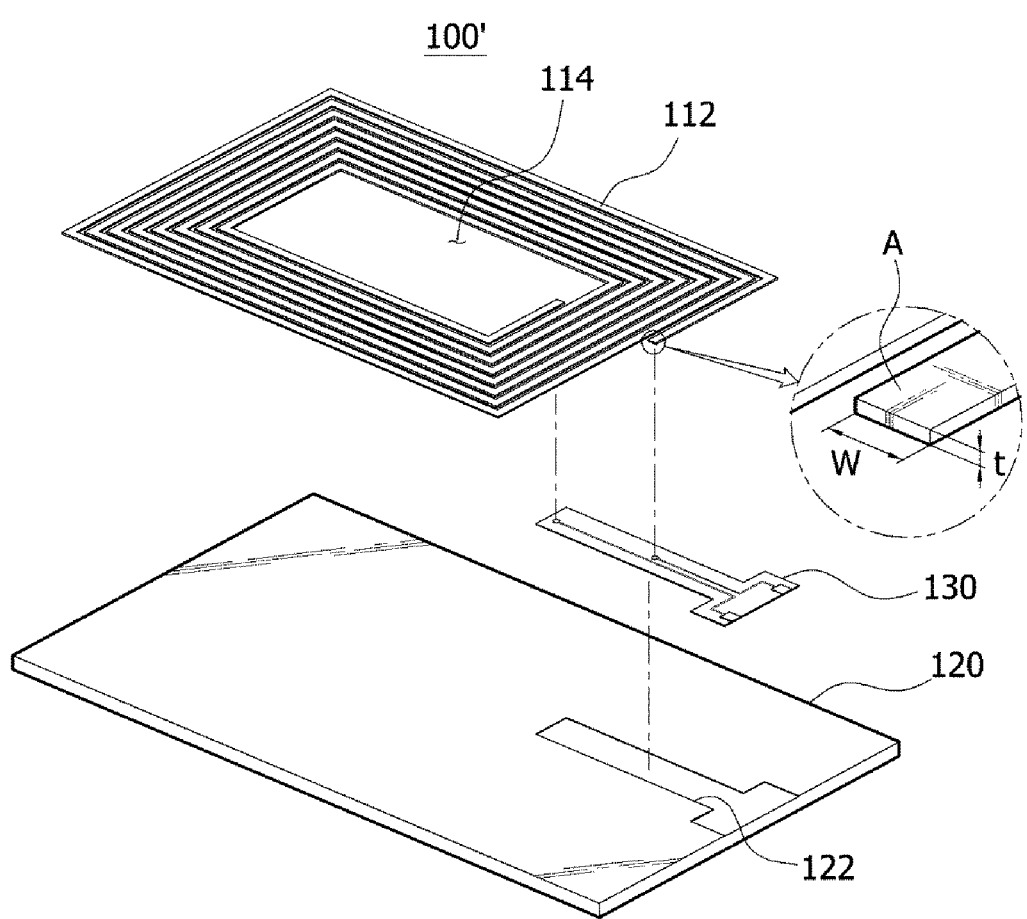
FIG. 6 is an exploded view of FIG. 5.
Figure 8:
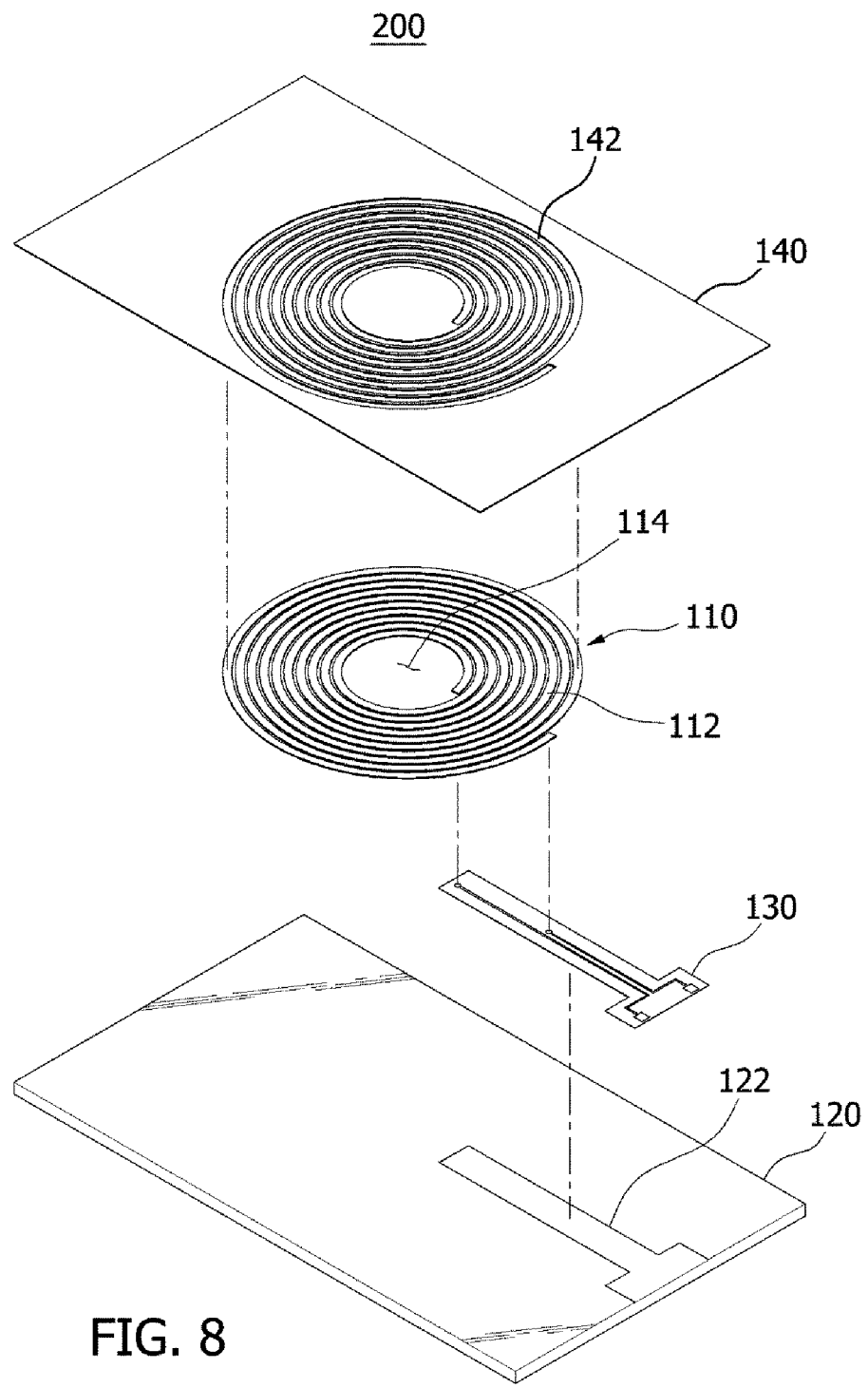
FIG. 8 is an exploded view of FIG. 7.

For example, as shown in FIGS. 2, 6 and 8, the accommodation groove 122 inwardly recessed from one surface facing the connection member 130 may be formed in the shielding sheet 120 or 220. In this case, the accommodation groove 122 may be formed with a depth approximately the same as the thickness of the connection member 130.

Accordingly, even when the connection member 130 is disposed between the wireless power receiving antenna 110 and the shielding sheet 120 or 220, the thickness of the connection member 130 may be accommodated in the accommodation groove 122. Accordingly, even when the connection member 130 is used, the wireless power receiving module 100, 100', 200, or 200' according to one embodiment of the present invention may prevent an increase in thickness due to the connection member 130.

That is, an overall thickness of the wireless power receiving module 100, 100', 200, or 200' according to one embodiment of the present invention may be the sum of a thickness of the wireless power receiving antenna 110 and a thickness of the shielding sheet 120 or 220. Accordingly, the wireless power receiving module 100, 100', 200, or 200' according to one embodiment of the present invention may have a thickness the same as or relatively smaller than that of a conventional wireless power receiving module in which the wireless power receiving antenna 110 is formed in an antenna pattern on one surface of a flexible circuit board.

For example, the overall thickness of the wireless power receiving module 100, 100', 200, or 200' may be smaller than or equal to 0.3 mm, but is not limited thereto, and may have various thicknesses depending on design conditions.

The shielding sheet 120 or 220 may be a plate-like sheet having a predetermined area. In this case, the wireless power receiving antenna 110 may be fixed to one surface of the shielding sheet 120 or 220.

Here, the shielding sheet 120 or 220 may shield a magnetic field generated from the wireless power receiving antenna 110 to increase focusability of the magnetic field. Accordingly, the shielding sheet 120 or 220 may enhance the performance of the wireless power receiving antenna 110 which operates in a predetermined frequency band.

To this end, the shielding sheet 120 or 220 may be formed of a magnetic material to shield the magnetic field generated from the wireless power receiving antenna 110.

For example, a ferrite sheet, a ribbon sheet including at least one of an amorphous alloy and a nanocrystalline alloy, a polymer sheet, or the like may be used as the shielding sheet 120 or 220. However, it is noted that a material of the shielding sheet 120 or 220 is not limited to the above, and all magnetic materials may be used.

Here, the ferrite sheet may be a sintered ferrite sheet, and may be a sheet including at least one of Ni—Zn ferrite and Mn—Zn ferrite. Further, the amorphous alloy or nanocrystalline alloy may include a three-element alloy or a five-element alloy, the three-element alloy may include Fe, Si and B, and the five-element alloy may include Fe, Si, B, Cu, and Nb.

In addition, the shielding sheet 220 may be a multilayer sheet in which a plurality of sheets are laminated in multiple layers. For example, as shown in FIGS. 4 and 10, the shielding sheet 220 may be a multilayer sheet in which a plurality of ribbon sheets 221a including at least one of the amorphous alloy and the nanocrystalline alloy are laminated in multiple layers through adhesive layers 221b. As a non-limiting example, the shielding sheet 220 may be a multilayer sheet in which three to seven layers of the ribbon sheets 221a are laminated.

Further, the shielding sheet 120 or 220 may be formed to be separated into a plurality of fine pieces to restrain the generation of eddy currents, the plurality of fine pieces may be provided to be completely or partially insulated between neighboring fine pieces, and each of the fine pieces may be formed to be randomly irregular.

Meanwhile, the conductive member A may be formed of a thin plate having a size in which a width W is relatively greater than a thickness t. That is, the conductive member A may have a width W two or more times the thickness t.

Figure 3:
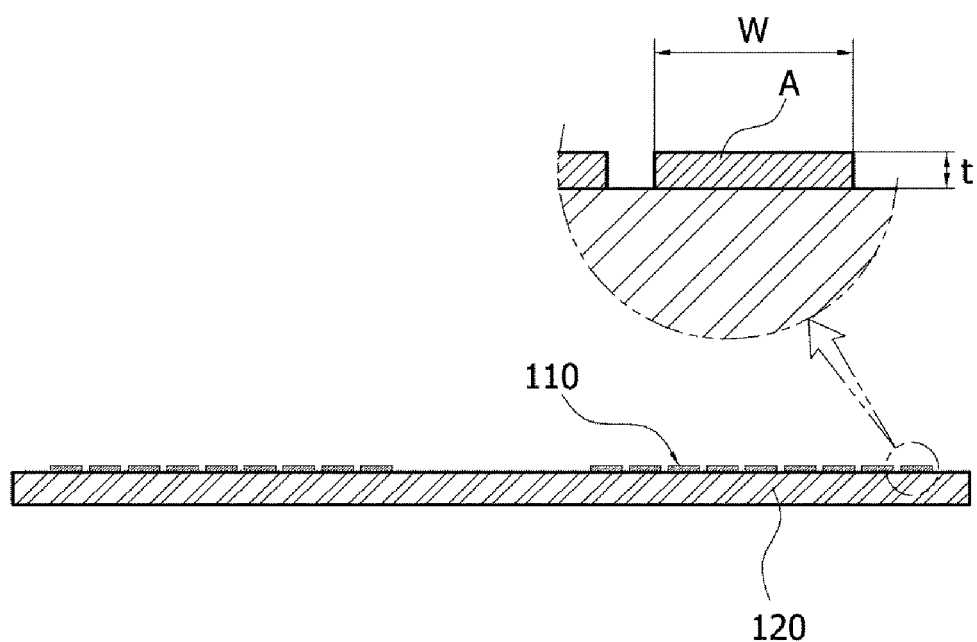
FIG. 3 is a cross-sectional view in direction A-A in FIG. 1.
Figure 9:
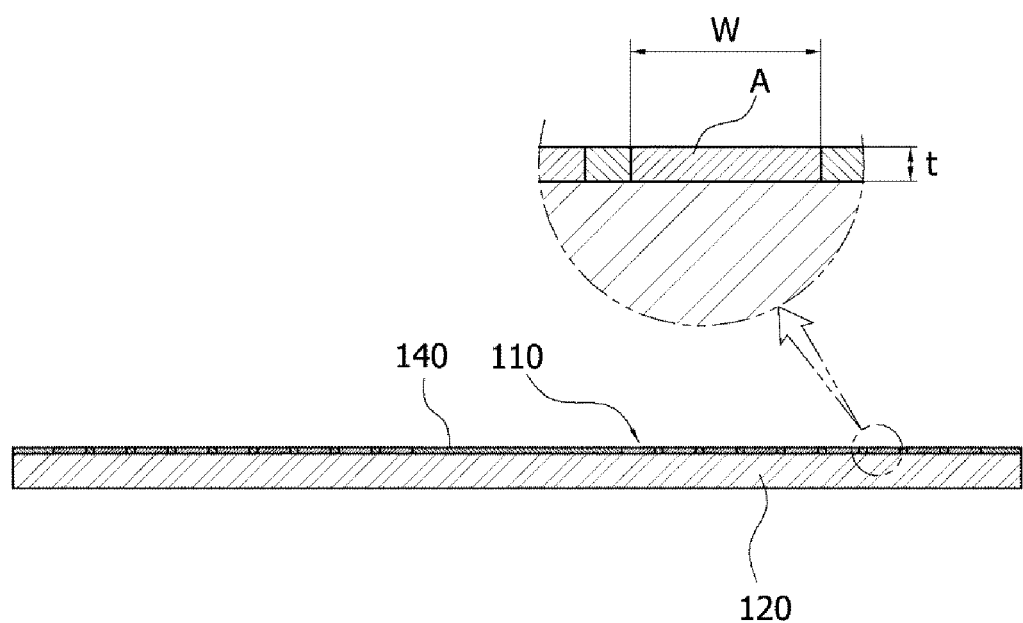
FIG. 9 is a cross-sectional view in direction B-B in FIG. 7.

For example, as shown in FIGS. 3, 6, and 9, the conductive member A may have a quadrangular cross-section shape, and the thickness t of the conductive member A may be 0.15 mm or smaller.

Accordingly, since the wireless power receiving antenna 110 may have a very thin thickness, the wireless power receiving module 100, 100', 200, or 200' may be implemented in a thin shape.

That is, the wireless power receiving module 100, 100', 200, or 200' according to one embodiment of the present invention may have a very thin thickness the same as that of the conventional wireless power receiving module in which the wireless power receiving antenna 110 is formed in the antenna pattern on one surface of the flexible circuit board.

Further, since the wireless power receiving module 100, 100', 200, or 200' according to one embodiment of the present invention does not require the flexible circuit board forming the antenna pattern in comparison with the conventional wireless power receiving module in which the wireless power receiving antenna is formed in the antenna pattern on one surface of the flexible circuit board, the width of the conductive member A may be increased as much as a thickness of the flexible circuit board.

Accordingly, since the conductive member A may have a relatively greater cross-sectional area than the conventional antenna pattern formed in one surface of the flexible circuit board, overall resistance may be reduced, and heat generated during operation may be reduced.

Accordingly, the wireless power receiving module 100, 100', 200, or 200' according to one embodiment of the present invention may reduce loss due to resistance and heat generation through an increase of the cross-sectional area of the conductive member A, and thus the performance as the antenna may be enhanced.

Meanwhile, as shown in FIGS. 7 to 11, the wireless power receiving modules 200 and 200' according to one embodiment of the present invention may further include the auxiliary shielding sheets 140 and 240 laminated on one surfaces of the shielding sheets 120 and 220, respectively.

The above-described auxiliary shielding sheet 140 or 240 is formed of a magnetic material like the shielding sheet 120 or 220, and thus may supplement the performance of the shielding sheet 120 or 220.

In this case, the auxiliary shielding sheet 140 or 240 may be disposed to form a coplanar surface with the conductive member A.

That is, the auxiliary shielding sheet 140 or 240 is laminated on a coplanar surface of the shielding sheet 120 or 220 together with the wireless power receiving antenna 110, and may be disposed not to overlap the conductive member A constituting the wireless power receiving antenna 110. Further, the auxiliary shielding sheet 140 or 240 may have a thickness approximately the same as that of the conductive member A constituting the wireless power receiving antenna 110.

Accordingly, in the wireless power receiving module 200 or 200' according to the embodiment, the overall thickness does not increase, and the auxiliary shielding sheet 140 or 240 may be laminated on one surface of the shielding sheet 120 or 220.

Accordingly, in the wireless power receiving module 200 or 200' according to the embodiment, since the performance of the shielding sheet 120 or 220 is supplemented through the auxiliary shielding sheet 140 or 240, the thickness of the shielding sheet 120 or 220 may be formed smaller in comparison with the wireless power receiving module 100 or 100' of the above-described embodiment.

Accordingly, the wireless power receiving module 200 or 200' according to the embodiment may further reduce the overall thickness while satisfying the required performance in comparison with the wireless power receiving module 100 or 100' of the above-described embodiment.

Further, when the wireless power receiving module 200 or 200' according to the embodiment is implemented to have the same thickness as that of the wireless power receiving module 100 or 100' of the above-described embodiment, the thickness of the conductive member A constituting the wireless power receiving antenna 110 may increase as much as a reduced thickness of the shielding sheet 120 or 220 through use of the auxiliary shielding sheet 140 or 240.

Accordingly, since the conductive member A of the wireless power receiving module 200 or 200' according to the embodiment may have a relatively greater cross-sectional area than the conductive member A used in the wireless power receiving module 100 or 100' of the above-described embodiment, overall resistance may be further reduced, and the heat generated during operation may be further reduced.

Accordingly, the wireless power receiving module 200 or 200' according to the embodiment may reduce the loss due to resistance and heat generation through the increase of the cross-sectional area of the conductive member A, and thus the performance as the antenna may be further enhanced.

For example, since the shielding sheet 120 or 220 may be implemented with a thickness smaller than or equal to 0.1 mm, the overall thickness of the wireless power receiving module 200 or 200' may have a thickness of 0.2 mm or smaller.

However, it is noted that the overall thickness of the wireless power receiving module 200 or 200' is not limited to the above, and may be appropriately changed according to design conditions.

In this case, as shown in FIGS. 11A to 11C, in the wireless power receiving module 200 or 200', the auxiliary shielding sheet 140 or 240 may have both a thickness the same as that of the shielding sheet 120 or 220 and a thickness different from that of the shielding sheet 120 or 220. Further, in the conductive member A, the thickness and the width may be the same, and may also be different.

As a specific example, the auxiliary shielding sheet 140 or 240 may include an inverse pattern portion 142 formed as a reverse image of the pattern portion 112 of the wireless power receiving antenna 110, and the inverse pattern portion 142 may be disposed in a space formed at the pattern portion 112 side of the wireless power receiving antenna. Here, the inverse pattern portion 142 may have a thickness the same as that of the conductive member A constituting the wireless power receiving antenna 110.

Accordingly, in the embodiment, when the auxiliary shielding sheet 140 or 240 is disposed on one surface of the shielding sheet 120 or 220, the auxiliary shielding sheet 140 or 240 may form a coplanar surface with the conductive member A.

Here, the inverse pattern portion 142 may be disposed in the space formed at the pattern portion side of the wireless power receiving antenna 110. Further, the auxiliary shielding sheet 140 or 240 may be disposed to completely surround the wireless power receiving antenna 110. That is, the auxiliary shielding sheet 140 or 240 may be disposed to surround both sides of the conductive member A constituting the wireless power receiving antenna. Accordingly, in the wireless power receiving antenna 110, the shielding sheet 120 or 220 and the auxiliary shielding sheet 140 or 240 may be respectively disposed on both side surfaces and a lower surface, other than an upper surface which is an exposed surface.

In this case, the inverse pattern portion 142 formed in the auxiliary shielding sheet 140 or 240 may be formed in various ways.

For example, the inverse pattern portion 142 may be formed through etching. That is, when the auxiliary shielding sheet 140 or 240 is formed of a material including a metal component, the inverse pattern portion 142 may be formed through etching.

Accordingly, when the auxiliary shielding sheet 140 or 240 is attached to one surface of the shielding sheet 120 or 220, the inverse pattern portion 142 may be inserted into the space formed at the pattern portion 112 side of the wireless power receiving antenna. In this case, the auxiliary shielding sheet 140 or 240 may be a ribbon sheet including at least one of an amorphous alloy and a nanocrystalline alloy.

Alternatively, the auxiliary shielding sheet 140 or 240 may be composed of magnetic powder in a slurry state. That is, in a state in which the wireless power receiving antenna 110 is attached to one surface of the shielding sheet 120 or 220, the magnetic powder in the slurry state may be applied on one surface of the shielding sheet 120 or 220.

Accordingly, the magnetic powder in the slurry state may be filled in the space formed at the pattern portion 112 side of the wireless power receiving antenna and the empty space 114 of the wireless power receiving antenna. And then, since the magnetic powder in the slurry state is dried, the auxiliary shielding sheet 140 or 240 may be configured to form a coplanar surface with the conductive member A. In this case, the magnetic powder may be ferrite powder.

Alternatively, the inverse pattern portion 142 may be formed through punching. In this case, in the auxiliary shielding sheet 140 or 240, a region corresponding to the pattern portion 112 of the wireless power receiving antenna 110 may be punched. Accordingly, when the auxiliary shielding sheet 140 or 240 is attached to one surface of the shielding sheet 120 or 220, the inverse pattern portion 142 may be inserted into the space formed at the pattern portion 112 side of the wireless power receiving antenna. In this case, a material which can be punched by a mold may be used for the auxiliary shielding sheet 140 or 240 without limitation.

Meanwhile, as described above, a magnetic material capable of supplementing the performance of the shielding sheet 120 or 220 may be used for the auxiliary shielding sheet 140 or 240 without limitation. Further, the auxiliary shielding sheet 140 or 240 may be formed of a material the same as a material forming the shielding sheet 120 or 220 or a material different from the material forming the shielding sheet 120 or 220.

As a non-limiting example, a ferrite sheet, a ribbon sheet including at least one of an amorphous alloy and a nanocrystalline alloy, a polymer sheet, or the like may be used as the auxiliary shielding sheet 140 or 240.

Further, the auxiliary shielding sheet 240 may be a multilayer sheet in which a plurality of sheets are laminated in multiple layers like the shielding sheet 220. For example, as shown in FIG. 10, the auxiliary shielding sheet 240 may be a multilayer sheet in which a plurality of ribbon sheets 241*a* including at least one of an amorphous alloy and a nanocrystalline alloy are laminated in multiple layers through adhesive layers 241*b*, and the auxiliary shielding sheet 240 may be a multilayer sheet in which three to seven layers of the ribbon sheets 241*a* are laminated.

Further, the auxiliary shielding sheet 140 or 240 may be formed to be separated into a plurality of fine pieces to restrain the generation of eddy currents, the plurality of fine pieces may be provided to be completely or partially insulated between neighboring fine pieces, and each of the fine pieces may be formed to be randomly irregular.

Meanwhile, when the auxiliary shielding sheet 140 or 240 includes a metal component, at least one of the auxiliary shielding sheet 140 or 240 and the wireless power receiving antenna 110 may include an insulating layer 116 formed on the surface thereof with a predetermined thickness.

For example, the wireless power receiving antenna 110 may include the insulating layer 116 formed on the surface of the conductive member A with a predetermined thickness as shown in FIG. 10. Accordingly, even when the auxiliary shielding sheet 140 or 240 is formed of a material including a metal component, the wireless power receiving antenna 110 may be insulated from the auxiliary shielding sheet 140 or 240 through the insulating layer 116, and thus an electrical short circuit with the auxiliary shielding sheet 140 or 240 may be prevented from occurring.

However, a position where the insulating layer 116 is formed is not limited thereto, and the insulating layer 116 may be formed to surround a surface of the inverse pattern portion 142 of the auxiliary shielding sheet 140 or 240. Further, the insulating layer 116 may be formed on both the inverse pattern portion 142 of the auxiliary shielding sheet 140 or 240 and the surface of the conductive member A.

Figure 12:
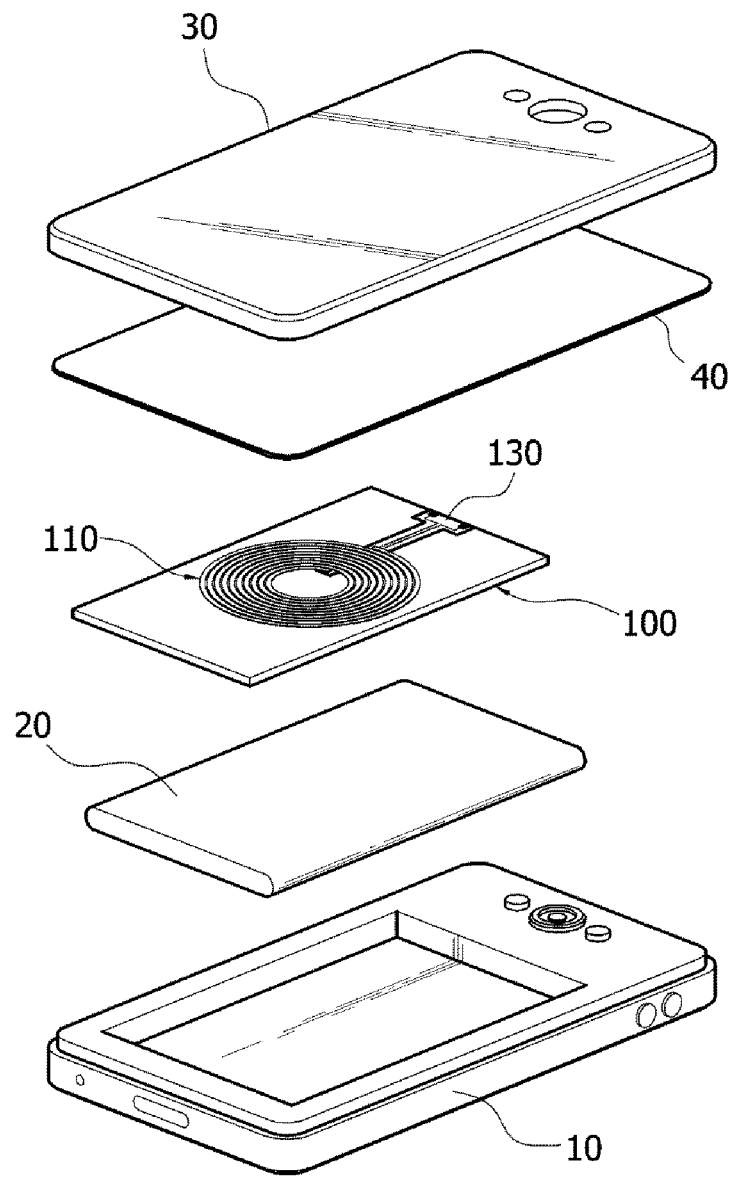
FIG. 12 is a view illustrating a portable electronic device to which the wireless power receiving module according to one embodiment of the present invention is applied.

As shown in FIG. 12, in a portable terminal, the wireless power receiving module 100, 100', 200, or 200' according to one embodiment of the present invention may be installed in a rear case of a terminal main body 10 or an inner side surface of a back cover 30.

For example, the wireless power receiving module 100, 100', 200, or 200' may be attached to the rear case of the terminal main body 10 or one surface of the back cover 30 through an adhesive member 40.

Here, the adhesive member 40 may be a base material type in which an adhesive is coated on both surfaces of a base material or a type without a base material.

Further, the portable terminal may be composed of the terminal main body 10 which performs functions of the portable terminal and the rear case or the back cover 30 provided on a rear surface of the terminal main body, and the rear case or the back cover 30 may be detachably coupled to the terminal main body 10 or may be integrally formed with the terminal main body 10.

In addition, the rear surface of the terminal main body 10 may have a region where a battery 20, a memory chip, and the like may be mounted, and the rear case or the back cover 30 may be detachably coupled to the terminal main body 10 for convenient replacement of the above and aesthetics of the portable terminal. In this case, the rear case or the back cover 30 may be referred to as a battery cover.

Although embodiments of the present invention have been described above, the spirit of the present invention is not limited to the embodiments shown in the description, and although those skilled in the art may provide other embodiments through the addition, change, or removal of the components within the scope of the same spirit of the present invention, such embodiments are also included in the scope of the spirit of the present invention.

The invention claimed is:

1. A wireless power receiving module comprising:
   a wireless power receiving antenna in which a conductive member having a rectangular cross section is formed in a loop shape;
   a shielding sheet disposed on one surface of the wireless power receiving antenna to shield a magnetic field; and
   a connection member to which both end portions of the wireless power receiving antenna are electrically connected,
   wherein the one surface of the wireless power receiving antenna is directly attached to the shielding sheet,
   wherein in the wireless power receiving antenna, one end portion of the both end portions is disposed in an empty space formed in a center portion of a pattern portion and the other end portion is disposed at an outer edge of the pattern portion, and
   wherein the connection member is disposed between the pattern portion and the shielding sheet to cross a portion of the pattern portion.

2. The wireless power receiving module of claim 1, wherein the wireless power receiving antenna is punched through stamping so that the conductive member has a rectangular cross section.

3. The wireless power receiving module of claim 1, wherein the conductive member includes an insulating layer formed on a surface thereof with a predetermined thickness.

4. The wireless power receiving module of claim 1, wherein the connection member is a thin circuit board.

5. The wireless power receiving module of claim 1, wherein:
   the shielding sheet includes an accommodation groove inwardly recessed in one surface thereof; and
   the connection member is seated in the accommodation groove.

6. The wireless power receiving module of claim 1, wherein the conductive member has a width two or more times a thickness thereof.

7. The wireless power receiving module of claim 1, wherein the shielding sheet is one among a ribbon sheet including at least one of an amorphous alloy and a nanocrystalline alloy, a ferrite sheet, and a polymer sheet.

8. The wireless power receiving module of claim 1, wherein the shielding sheet is a multilayer sheet in which a plurality of ribbon sheets including at least one of an amorphous alloy and a nanocrystalline alloy are laminated in multiple layers.

9. A wireless power receiving module comprising:
   a wireless power receiving antenna in which a conductive member having a rectangular cross section is formed in a loop shape;
   a shielding sheet disposed on one surface of the wireless power receiving antenna to shield a magnetic field; and an auxiliary shielding sheet laminated on one surface of the shielding sheet, wherein the one surface of the wireless power receiving antenna is directly attached to the shielding sheet, wherein the auxiliary shielding sheet includes an inverse pattern portion formed as a reverse image of the pattern portion of the wireless power receiving antenna; and the inverse pattern portion is inserted and disposed in a space formed between the pattern portions of the wireless power receiving antenna, and wherein the auxiliary shielding sheet is disposed to form a coplanar surface with one surface of the conductive member.

10. The wireless power receiving module of claim 9, wherein the inverse pattern portion is formed through etching.

11. The wireless power receiving module of claim 10, wherein at least one of the auxiliary shielding sheet and the wireless power receiving antenna includes an insulating layer formed on a surface thereof with a predetermined thickness.

12. The wireless power receiving module of claim 9, wherein the auxiliary shielding sheet is a ribbon sheet including at least one of an amorphous alloy and a nanocrystalline alloy.

13. The wireless power receiving module of claim 9, wherein the auxiliary shielding sheet is a multilayer sheet in which a plurality of ribbon sheets including at least one of an amorphous alloy and a nanocrystalline alloy are laminated in multiple layers.

14. The wireless power receiving module of claim 9, wherein magnetic powder in a slurry state is applied on the one surface of the shielding sheet and then dried to form the auxiliary shielding sheet.

15. The wireless power receiving module of claim 14, wherein the magnetic powder is ferrite powder.

16. The wireless power receiving module of claim 9, wherein the auxiliary shielding sheet has the same thickness as the shielding sheet.

17. A portable electronic device comprising:

a terminal main body;

a rear case provided on a rear surface of the terminal main body; and a wireless power receiving module installed in the rear case of the terminal main body, wherein the wireless power receiving module including:

a wireless power receiving antenna in which a conductive member having a rectangular cross section is formed in a loop shape;

a shielding sheet disposed on one surface of the wireless power receiving antenna to shield a magnetic field, and a connection member to which both end portions of the wireless power receiving antenna are electrically connected, wherein the one surface of the wireless power receiving antenna is directly attached to the shielding sheet;

wherein in the wireless power receiving antenna, one end portion of the both end portions is disposed in an empty space formed in a center portion of a pattern portion and the other end portion is disposed at an outer edge of the pattern portion, and wherein the connection member is disposed between the pattern portion and the shielding sheet to cross a portion of the pattern portion.

* * * * *